US012749034B2

(12) United States Patent
Sanzone et al.

(10) Patent No.: US 12,749,034 B2
(45) Date of Patent: Sep. 29, 2026

(54) MACHINE LEARNING TO PREDICT PART CONSUMPTION USING FLIGHT DEMOGRAPHICS

(71) Applicant: THE BOEING COMPANY, Chicago, IL (US)

(72) Inventors: Andrea Sanzone, Neu-Isenburg (DE); Millie Sterling, Neu-Isenburg (DE); Rahul Ashok, Singapore (SG); Rowena Loh, Singapore (SG)

(73) Assignee: THE BOEING COMPANY, Chicago, IL (US)

( * ) Notice: Subject to any disclaimer, the term of this patent is extended or adjusted under 35 U.S.C. 154(b) by 449 days.

(21) Appl. No.: 17/742,267

(22) Filed: May 11, 2022

(65) Prior Publication Data

US 2023/0368678 A1 Nov. 16, 2023

(51) Int. Cl.
*G06Q 10/0631* (2023.01)
*G06Q 10/087* (2023.01)

(52) U.S. Cl.
CPC ..... *G06Q 10/06315* (2013.01); *G06Q 10/087* (2013.01)

(58) Field of Classification Search
None
See application file for complete search history.

(56) References Cited

U.S. PATENT DOCUMENTS 8,131,582 B2 * 3/2012 Jiang .................. G06Q 30/0202
705/7.31
11,907,913 B2 * 2/2024 Thakkar ............. G06Q 30/0633
2017/0091619 A1 * 3/2017 Towal .................... G06V 10/82
2017/0323274 A1 11/2017 Johnson et al.
2019/0177008 A1 * 6/2019 Floyd ...................... G06F 3/048
2022/0051198 A1 * 2/2022 Thakkar ........... G06Q 10/06315

FOREIGN PATENT DOCUMENTS

CN 108510101 A * 9/2018 ........... G06F 18/295
EP 3432231 A1 1/2019
WO 2020053778 A1 3/2020

OTHER PUBLICATIONS

Jordan, Etemandi, and Grenn, Predicting KC-135R Aircraft Availability with Aircraft Metrics, IEEE Transactions on Engineering Management, vol. 69, No. 6 (Year: 2022).*
European Patent Office, extended European Search Report for Application 23170735.7-1218 dated Sep. 27, 2023.
EPO Communication for corresponding EP patent application No. 23 170 735.7 mailed Feb. 17, 2026 (6 pages).

* cited by examiner

*Primary Examiner* — Mehmet Yesildag
*Assistant Examiner* — Michael Borowski
(74) *Attorney, Agent, or Firm* — Carroll, Hoette & Butscher, LLC; Josef L. Hoffmann

(57) ABSTRACT

The present disclosure provides for using machine learning to evaluate flight demographics and predict part consumption. Historical aircraft part consumption data indicating prior consumption of aircraft parts is accessed, and historical aircraft flight demographics associated with the historical aircraft part consumption data are determined. A machine learning model is trained based on the historical aircraft part consumption data and the historical aircraft flight demographics, and the machine learning model is deployed to predict future aircraft part consumption.

18 Claims, 8 Drawing Sheets

MACHINE LEARNING TO PREDICT PART CONSUMPTION USING FLIGHT DEMOGRAPHICS

Aspects of the present disclosure relate to machine learning. More particularly, the present disclosure provides systems and methods for predicting part consumption using machine learning and flight demographics.

BACKGROUND

A wide variety of industries rely on complex machinery that requires periodic servicing. Such servicing often involves use or consumption of spare parts (e.g., to replace worn or damaged parts of the system). To reduce downtime and improve system efficiency, many entities seek to maintain a storage of spare parts (particularly those that are commonly needed) for future servicing. However, it is difficult or impossible to predict precisely what parts will be needed, as well as when they will be needed. Often, providers of such spare parts similarly attempt to estimate how many parts (and what types) will be needed. Additionally, lack of data sharing (such as due to perceived competitive advantages among airlines) has proven problematic for prior attempts to improve these systems.

Conventional forecasting methods and systems are not well-defined and have low accuracy for a variety of reasons. Inaccurate forecasting of future sales or consumption of spare parts has a tremendously negative impact on inventory management and lead times, often causing significant additional costs, lost revenue, extended system downtime, and other issues. For example, wrong or inaccurate spare parts forecasts can unnecessarily increase inventory levels and/or increase lead times to secure the needed parts.

SUMMARY

In one aspect of the present disclosure, a method is provided. The method includes: accessing historical aircraft part consumption data indicating prior consumption of aircraft parts; determining historical aircraft flight demographics associated with the historical aircraft part consumption data; training a machine learning model based on the historical aircraft part consumption data and the historical aircraft flight demographics; and deploying the machine learning model to predict future aircraft part consumption.

In one aspect, in combination with any example method above or below, the historical aircraft part consumption data comprises, for each respective part type of a plurality of part types, a respective amount of the respective part type that was consumed for aircraft maintenance during a window of time.

In one aspect, in combination with any example method above or below, the historical aircraft flight demographics comprises: amounts of each respective part type, of the plurality of part types, that were in aircraft service during the window of time, flight times associated with each respective part type, of the plurality of part types, during the window of time, numbers of flights associated with each respective part type, of the plurality of part types, during the window of time, and destination locales of flights associated with each respective part type, of the plurality of part types, during the window of time.

In one aspect, in combination with any example method above or below, training the machine learning model comprises: generating predicted aircraft part consumption by processing the historical aircraft flight demographics using the machine learning model determining a difference between the historical aircraft part consumption data and the predicted aircraft part consumption, and refining the machine learning model based on the difference.

In one aspect, in combination with any example method above or below, the method further comprises: forecasting future aircraft flight demographics, and generating predicted future aircraft part consumption by processing the future aircraft flight demographics using the machine learning model.

In one aspect, in combination with any example method above or below, forecasting the future aircraft flight demographics comprises: forecasting, for each respective aircraft type of a plurality of aircraft types, a respective number of aircraft of the respective type that will be used, and forecasting one or more exogenous indicators.

In one aspect, in combination with any example method above or below, forecasting, for each respective aircraft type of a plurality of aircraft types, the respective number of aircraft of the respective type that will be used comprises, for each respective aircraft type of the plurality of aircraft types: determining a respective current number of active aircraft associated with the respective aircraft type, determining a respective number of expected deliveries of aircraft associated with the respective aircraft type, and determining a respective number of retirements of aircraft associated with the respective aircraft type.

In one aspect, in combination with any example method above or below, the one or more exogenous indicators comprise: gross domestic product (GDP) growth, crude oil price, and stock price of one or more airlines.

The present disclosure provides a system in one aspect. The system includes a processor, a memory storage device including instructions that when executed by the processor enable performance of an operation in accordance with any combination of the above methods.

The present disclosure provides a computer program product in one aspect, the computer program product including a computer-readable storage medium having computer-readable program code embodied therewith, the computer-readable program code executable by one or more computer processors to perform an operation in accordance with any combination of the above methods.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
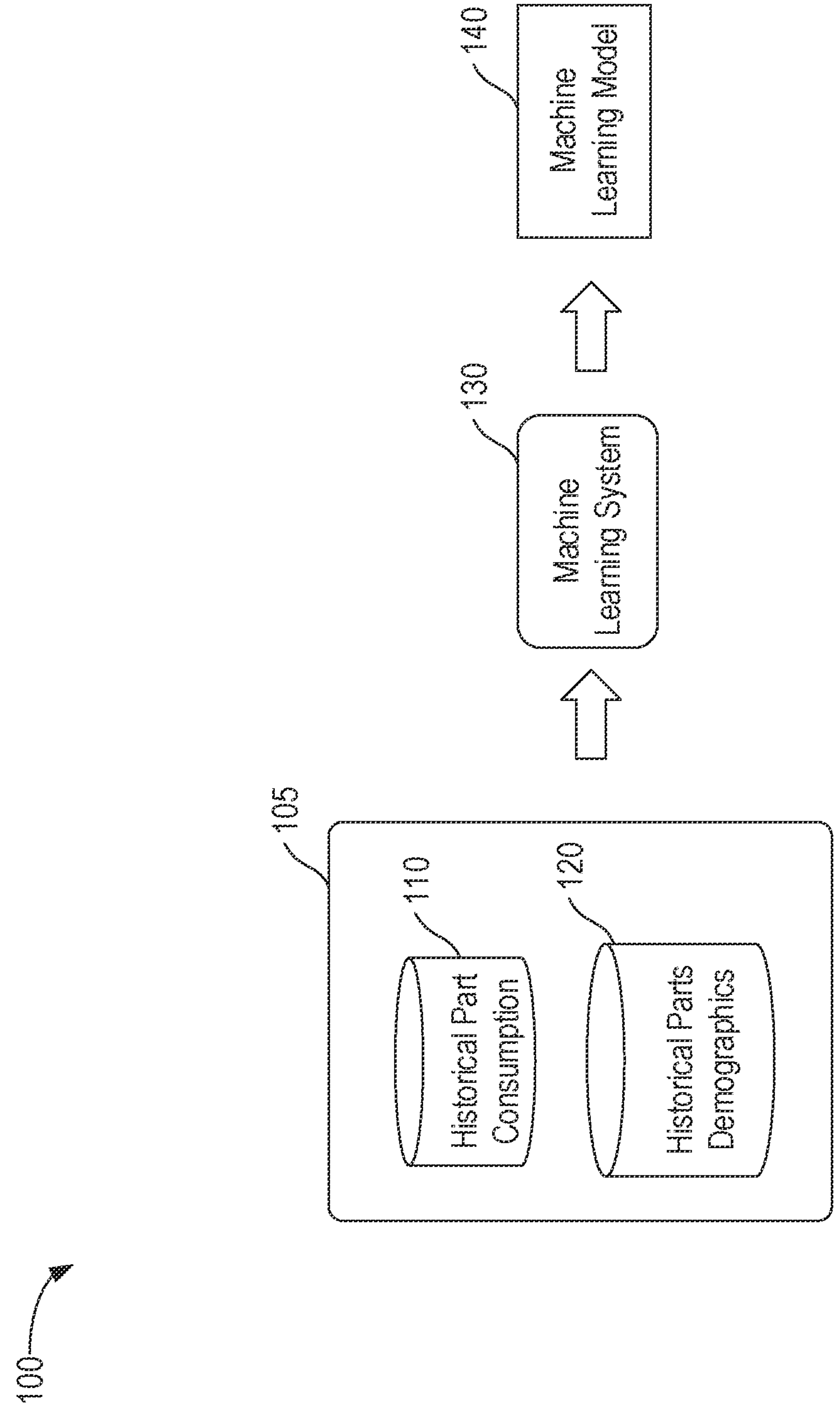
FIG. 1 depicts an example workflow for training machine learning models to predict part consumption based on flight demographics.

The present disclosure relates to systems and methods for machine learning to improve predictions of part consumption based on flight demographics. While examples described herein relate to aircraft, the systems and methods described herein may be utilized in a variety of applications, such as land craft (e.g., trucking), sea craft, manufacturing, and the like.

In some embodiments, rather than being based strictly on historical consumption data, the systems disclosed herein are able to exploit the potential of alternative available data sources, and can evaluate the current and historical flight demographics (e.g., aircraft types and configurations, flight hours, flight cycles, destinations flown, and the like) which provides significantly improved accuracy of spare parts forecasts or predictions.

As used herein, part consumption generally refers to the removal of a part from inventory or storage, such that it is no longer available for future needs. For example, consumption may refer to a sale of the part to a consumer, installation or integration of a part onto an aircraft or other machinery, use of a part to perform servicing (e.g., where the part is discarded after use), and the like. As used herein, "parts" (also referred to as "spare parts" in some aspects) generally include any consumable item, such as replaceable parts on an aircraft.

In some embodiments, future consumption of spare parts are predicted or forecasted in part by correlating historical consumption and the number of currently-active and/or historically-active parts (e.g., parts on airplanes that are or were in service). Additionally, in an embodiment, flight demographics (e.g., aircraft types and configurations, flight hours, cycles, destinations flown, and the like) can be used to derive the parts demographics of such parts.

In some embodiments, the system can predict the future consumption of spare parts by forecasting the number of active parts for some future window of time (as well as the associated parts demographics) and correlating the data with the historical consumption (and demographics). By considering flight demographics, the system is able to substantially increase the accuracy of spare part consumption forecasts allowing for better managed inventories, reduced spare parts lead times, and overall increased customer satisfaction.

In some embodiments, the system can determine the historical consumption linked to previously-active parts and the associated parts demographics, as discussed in more detail below. This data may be used to train one or more machine learning models, or may otherwise be correlated with current data to predict future consumption.

In an embodiment, the system (or another system) may evaluate a variety of data to forecast the number of currently-active or future-active parts (and the associated parts demographics), as discussed in more detail below. Such forecasts can then be used to predict future part consumption, enabling a more accurate prediction as to the number and types of parts that will be needed in the future.

FIG. 1 depicts an example workflow 100 for training machine learning models to predict part consumption based on flight demographics. In the illustrated workflow 100, a machine learning system 130 receives and evaluates a variety of historical data 105 to train one or more machine learning models 140. Although depicted as a discrete system for conceptual clarity, in some embodiments, the machine learning system 130 may be implemented as a standalone system or as part of a larger system. Further, the operations of the machine learning system 130 may be implemented using hardware, software, or a combination of hardware and software.

The historical data 105 generally includes data from one or more prior points or windows in time. In the illustrated example, the historical data 105 includes data relating to historical part consumption 110 and historical parts demographics 120. In some embodiments, the historical data 105 includes information associated with one or more defined windows of time (e.g., data from the past year, or from the past decade). The historical part consumption 110 generally includes data relating to use of parts, sales of parts, or other consumption of spare parts. For example, in some aspects, the historical part consumption 110 corresponds to prior parts sales (e.g., from a manufacturer or other provider to customers, such as airlines or maintenance entities). In some embodiments, the historical part consumption 110 corresponds to prior use of parts (e.g., using them to replace a worn part of an aircraft).

In some embodiments, the historical part consumption 110 can include contextual information relating to the consumption, such as which types of parts were consumed (e.g., indicated by the model numbers of the parts), how the parts were consumed (e.g., by sale, by expiration or retirement, by integration into an aircraft, and the like), when the consumption occurred, how many total parts of each type were consumed during the historical window, the entity that consumed the parts (e.g., the customer or mechanic) and the like. For example, the historical part consumption may indicate that N parts with model number 12345 were sold to a given airline during a given window of time.

Generally, the historical part consumption 110 can include information relating to any number of parts and/or types of parts. Additionally, as discussed above, though aircrafts are used in some examples discussed herein, the historical part consumption 110 may correspond to other items such as parts for manufacturing equipment, parts for land or sea vehicles, and the like.

In the illustrated example, the historical data 105 further includes historical parts demographics 120. The historical parts demographics 120 can generally correspond to information relating to which parts were in active use during the historical time(s), as well as various demographics for those parts. In at least one embodiment, the historical parts demographics 120 correspond to a window of time immediately prior to the time associated with the historical part consumption 110. That is, the historical parts demographics 120 may be associated with a first window of time, and the historical part consumption 110 may be associated with the subsequent window of time, such that the historical parts demographics 120 can be used to predict the historical part consumption 110. One example of how the historical parts demographics 120 can be generated or collected is discussed in more detail below with reference to FIG. 2.

In some embodiments, the historical parts demographics 120 may include data for each part type reflected in the historical part consumption 110. That is, for each part type that was consumed or used (as indicated in the historical part consumption 110), the historical parts demographics may include information such as the number of such parts that were in active service. For example, the historical parts demographics 120 may indicate that M parts of model number 54321 were in active use on aircraft during the time.

As used herein, the demographics of a part generally corresponds to characteristics of the use of the part. In one such embodiment, in the case of aircraft, the demographics may indicate the total number of flights that a given part type was been used on during the historical window of time, the average or total time and/or distance of such flights, the origin(s) and/or destination(s) of such flights, and the like. These demographics may include aggregate data (e.g., the total number of flights across all the discrete parts), average data (e.g., the average number of flights each discrete part saw), individual data (e.g., the specific number of flights a specific part saw), and the like.

For example, the data may indicate that M parts with model number 13579 were used on aircraft during the window, and that the parts saw an average of F flight hours per part during that time (or a total of T flight hours across all of the parts). As such demographics may influence part consumption, the machine learning system 130 can use this data to help train the machine learning models 140.

Although depicted as residing independently from the machine learning system 130, in some embodiments, the machine learning system 130 may store the historical data 105 locally. Generally, the machine learning system 130 can use the historical data 105 to train one or more machine learning models 140 to predict future part consumption. In one embodiment, the machine learning system 130 may use some of the data (e.g., the historical parts demographics 120) as input for the model, and use the corresponding historical part consumption 110 as target output.

That is, for a given part type, the machine learning system 130 may use the historical parts demographics 120 of the given part type as input, and the number of parts of that part type that were consumed (indicated in the historical part consumption 110) as target output. For example, the input features may include data such as the total number of active parts of the part type, the total or average flight hours of the parts during the window, the total or average number of flights that included or used the parts, the destination locales of the flights that used the parts, and the like.

By processing these features as input to the model, the model can generate an output relating to part consumption, such as a predicted number of parts having the specific part type that will be needed or consumed during a future window of time. By comparing this prediction against the ground-truth historical part consumption 110, the machine learning system 130 can generate a loss that is then used to refine the machine learning model 140. For example, if the machine learning model 140 is a neural network, the machine learning system 130 may use backpropagation to iteratively refine the weights and/or biases of the network.

During training, the machine learning model 140 learns to generate more accurate predictions (e.g., a predicted number of consumed parts that is closer to the actual value) based on the historical data 105. After training, the machine learning system 130 may deploy the machine learning model 140 for use. As used herein, deploying the model may include instantiating it locally for use, by the machine learning system 130, to predict future consumption. In some embodiments, the machine learning system 130 may additionally or alternatively deploy the machine learning model 140 to one or more other systems, each of which can then instantiate and use the model to predict future consumption.

Although a single machine learning model 140 is depicted for conceptual clarity, in some embodiments, multiple models may be trained. For example, in at least one embodiment, the machine learning system 130 can train a machine learning model 140 for each part type (e.g., a first model to predict part consumption of a first part type, and a second model to predict consumption of a second part type). In some embodiments, the machine learning system 130 can train a separate model for each physical location based on data associated with that particular location. For example, for each region (e.g., each country) or for each warehouse that stores and/or provides such parts, the machine learning system 130 may train a separate machine learning model 140 using data associated with that particular region or facility.

Figure 2:
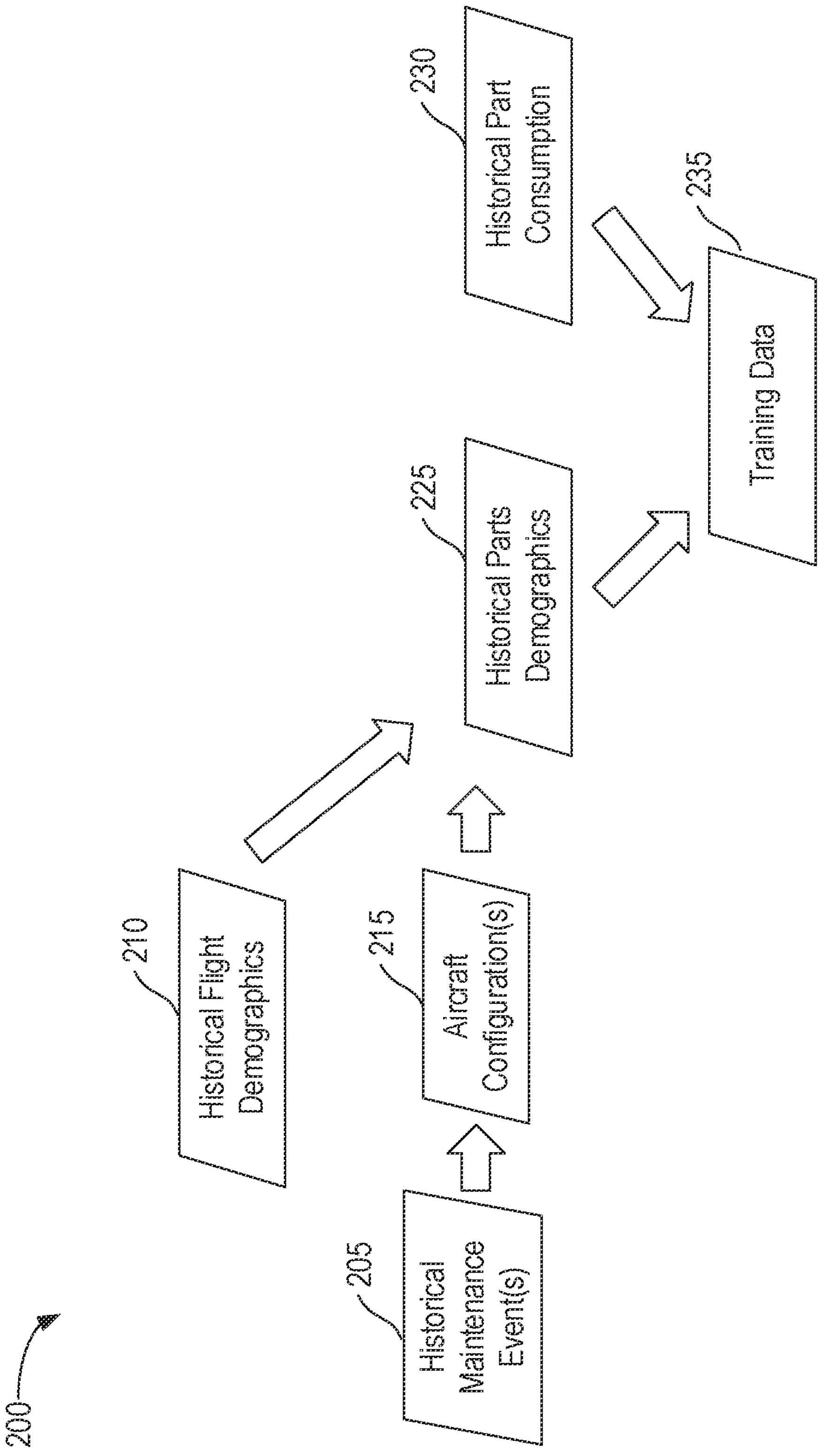
FIG. 2 depicts an example workflow for generating training data to train machine learning models to predict part consumption based on flight demographics.

FIG. 2 depicts an example workflow 200 for generating training data to train machine learning models to predict part consumption based on flight demographics. In some embodiments, the workflow 200 is performed by a machine learning system, such as machine learning system 130 of FIG. 1. In other embodiments, the workflow 200 can be performed by one or more other systems, such as dedicated data collection and/or management systems.

In one embodiment, the workflow 200 provides additional detail for how the historical data 105 is collected and/or generated. Although the illustrated example includes a variety of specific data sources, in some embodiments, the specific data used to create the training data 235 may vary. That is, some of the illustrated sources (e.g., historical maintenance events 205) may be excluded or not considered and/or other sources not illustrated may be included or considered.

As illustrated, the machine learning system can use data such as historical flight demographics 210, and aircraft configurations 215 during one or more prior windows of time to generate the historical parts demographics 225 (which may correspond to the historical parts demographics 120 of FIG. 1).

The historical flight demographics 210 generally include information relating to prior flights that used one or more parts. For example, as discussed above, the historical flight demographics 210 may include data such as the total number of flights for each aircraft (or type of aircraft), the flight time or duration, and the like. By correlating this flight information with the specific parts active on each aircraft (or type of aircraft), the machine learning system can determine the demographics of each part (or type of part).

As illustrated, the aircraft configurations 215 generally include information relating to which part types are used by each aircraft (or aircraft type). For example, for each alternative type of aircraft (e.g., each model of airplane), the aircraft configurations 215 may indicate the specific types of part that are used and/or the number of each type of part that is used by each such aircraft. In embodiments, this may include generic information (e.g., indicating that aircraft of the given type use N parts of a given type) and/or specific information (e.g., indicating that a specific aircraft (designated by a specific tail number or other identifier) had M parts of the specific type during the window).

In some embodiments, the machine learning system may determine and/or evaluate historical maintenance events 205 in order to determine aircraft configurations 215 during a prior window of time. That is, the machine learning system may identify evaluate prior maintenance records (e.g., indicating that a particular part or part type was repaired and/or replaced on a given aircraft) to determine or infer the overall aircraft configuration 215 for the specific aircraft (or for all aircraft of the given type). In other embodiments, the aircraft configurations 215 may be determined via other means (such as predefined or fixed definitions provided by the aircraft manufacturer).

As illustrated, the machine learning system can correlate the data (e.g., the historical flight demographics 210, and/or aircraft configurations 215) on a per-part type basis (e.g., correlating the data associated with each part number or other identifier) to create the historical parts demographics 225. As discussed above, this data may be used as the input to the machine learning model in order to generate one or more predicted outputs.

In the illustrated workflow 200, the machine learning system also receives or determines the historical part consumption 230 (which may correspond to the historical part consumption 110 of FIG. 1). As discussed above, the historical part consumption 230 can generally include information relating to the consumption of one or more spare parts or types of spare parts, such as how many units were sold and/or purchased during a window of time. In some embodiments, as discussed above, the historical part consumption 230 corresponds to a window of time immediately after the window of time associated with the historical parts demographics 225.

As illustrated, the machine learning system can correlate the historical parts demographics 225 and historical part consumption 230 to create training data 235. For example, for each part type (e.g., for each model number or other identifier), the machine learning system can identify the corresponding historical parts demographics, and label this data with the corresponding historical part consumption 230. This allows the machine learning system to train one or more machine learning models to predict part consumption based on part demographics, as discussed above.

Figure 3:
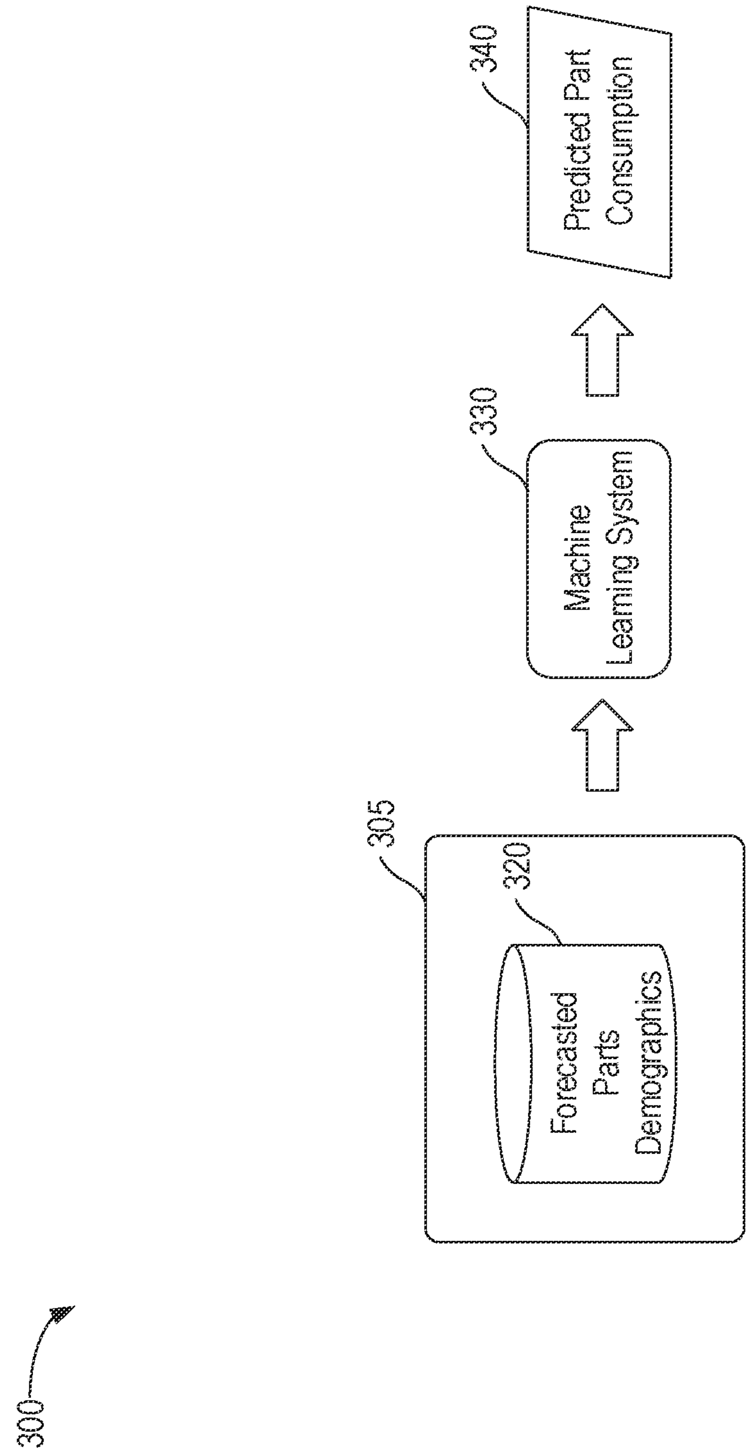
FIG. 3 depicts an example workflow for using trained machine learning models to predict part consumption based on flight demographics.

FIG. 3 depicts an example workflow 300 for using trained machine learning models to predict part consumption based on flight demographics. In the illustrated workflow 300, a machine learning system 330 (which may correspond to the machine learning system 130 of FIG. 1, or may be a discrete system) receives and evaluates a variety of input data 305 using one or more machine learning models (e.g., machine learning models 140) to generate predicted part consumption 340. Although depicted as a discrete system for conceptual clarity, in some embodiments, the machine learning system 330 may be implemented as a standalone system or as part of a larger system. Further, the operations of the machine learning system 330 may be implemented using hardware, software, or a combination of hardware and software.

The input data 305 can generally include a wide variety of data. In the illustrated example, the input data 305 includes data relating to forecasted parts demographics 320. In some embodiments, the input data 105 includes information associated with one or more defined windows of time (e.g., current data, data from the past year, and the like).

The forecasted parts demographics 320 can generally correspond to predicted or forecasted information relating to which parts will be in active use during the present time and/or one or more future time(s), as well as various (actual or predicted) demographics for those parts. In at least one embodiment, the forecasted parts demographics 320 correspond to a window of time immediately subsequent to the current time. One example of how the forecasted parts demographics 320 can be generated or collected is discussed in more detail below with reference to FIG. 4.

In some embodiments, the forecasted parts demographics 320 may include data for each part type that was used to train the machine learning model(s). That is, for each part type for which consumption can be predicted using a model, the forecasted parts demographics 320 may include information such as the number of such parts that are or will be in active service. For example, the forecasted parts demographics 320 may indicate that M parts of model number 54321 are or will be in active use on aircraft during the next year.

As discussed, the demographics of a part generally corresponds to characteristics of the use of the part. In one such embodiment, in the case of aircraft, the demographics may indicate the total number of flights that a given part type has been used on (or is expected to be used on) during a future window of time, the average or total time and/or distance of such flights, the origin(s) and/or destination(s) of such flights, and the like. These demographics may include aggregate data (e.g., the total number of flights across all the discrete parts), average data (e.g., the average number of flights each discrete part saw), individual data (e.g., the specific number of flights a specific part saw), and the like.

For example, the data may indicate that M parts with model number 13579 will be used on aircraft during the next window of time, and that the parts will experience an average of F flight hours per part during that time (or a total of T flight hours across all of the parts). As such demographics may influence future part consumption, the machine learning system 330 can use this data to predict the future consumption using the machine learning model(s).

Although depicted as residing independently from the machine learning system 330, in some embodiments, the machine learning system 330 may store the input data 105 locally. Generally, the machine learning system 330 can process the input data 305 using one or more machine learning models to predict future part consumption 340.

For example, for a given part type, the machine learning system 330 may use the forecasted parts demographics 320 of the given part type as input to the model in order to generate predicted part consumption 340 for the part type. For example, as discussed above, the input features may include data such as the total number of active parts of the part type, the total or average flight hours of the parts during the window, the total or average number of flights that will include or use the parts, the destination locales of the flights that will use the parts, and the like. By processing these features as input to the model, the model can generate an output relating to part consumption, such as a predicted number of parts having the specific part type that will be needed or consumed during the future window of time.

In an embodiment, the predicted part consumption 340 generally includes data relating to use of parts, sales of parts, or other consumption of spare parts. For example, in some aspects, the predicted part consumption 340 corresponds to predicted or expected parts sales (e.g., from a manufacturer or other provider to customers, such as airlines or maintenance entities). In some embodiments, the predicted part consumption 340 corresponds to other use of parts (e.g., using them to replace a worn part of an aircraft).

In some embodiments, the predicted part consumption 340 can include contextual information relating to the consumption, such as which types of parts are expected to be consumed (e.g., indicated by the model numbers of the parts), how the parts are expected to be consumed (e.g., by sale, by expiration or retirement, by integration into an aircraft, and the like), when the consumption is expected to occur, how many total parts of each type will be consumed during the future window, the entity or entities that will consume the parts (e.g., the customer or mechanic) and the like. For example, the predicted part consumption 340 may indicate that N parts with model number 12345 will be sold or otherwise consumed.

Generally, as discussed above, the predicted part consumption 340 can include information relating to any number of parts and/or types of parts. Additionally, as discussed above, though aircrafts are used in some examples discussed herein, the predicted part consumption 340 may correspond to other items such as parts for manufacturing equipment, parts for land or sea vehicles, and the like.

In some embodiments, as discussed above, the machine learning system 330 may use a single machine learning model for all parts. In some embodiments, multiple models may be used. For example, in at least one embodiment, the machine learning system 330 can use part-specific models, location-specific models, and the like. In one such embodiment, the machine learning system 330 may identify or select the proper model based on the forecasted parts demographics 320. For example, the machine learning system 330 may determine which part type a given set of the data belongs to, and use the corresponding model to generate predicted part consumption 340 of the specific part type.

Figure 4:
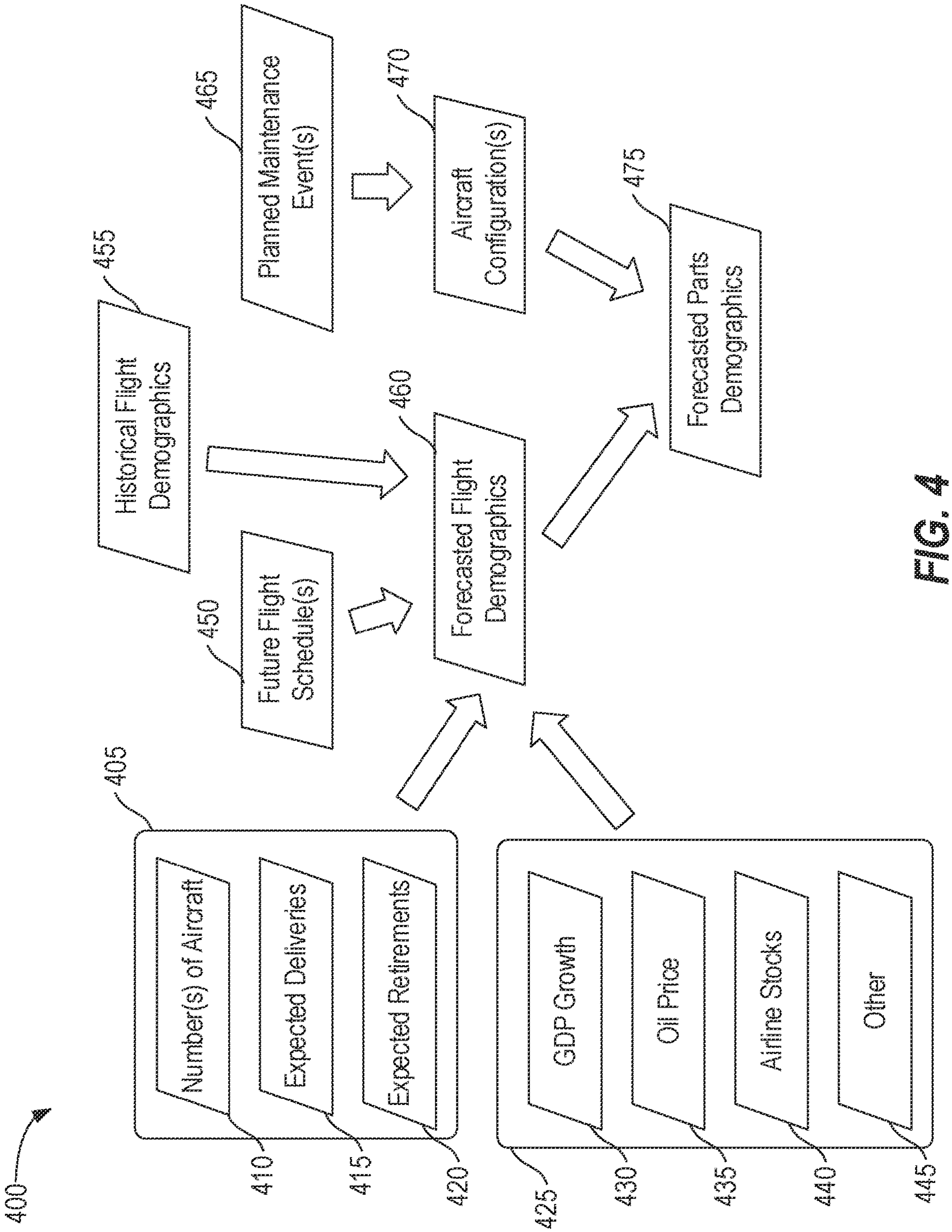
FIG. 4 depicts an example workflow for forecasting active part and flight demographics to improve part consumption predictions.

FIG. 4 depicts an example workflow 400 for forecasting active part and flight demographics to improve part consumption predictions. In some embodiments, the workflow 400 is performed by a machine learning system, such as machine learning system 130 of FIG. 1 and/or the machine learning system 330 of FIG. 3. In other embodiments, the workflow 400 can be performed by one or more other systems, such as dedicated data collection and/or management systems.

In one embodiment, the workflow 400 provides additional detail for how the forecasted parts demographics 475 are collected and/or generated. The forecasted parts demographics 475 may correspond to the forecasted parts demographics 320 of FIG. 3 in some embodiments. Although the illustrated example includes a variety of specific data sources, in some embodiments, the specific data used to create the forecasted parts demographics 475 may vary. That is, some of the illustrated sources (e.g., planned maintenance events 465) may be excluded or not considered and/or other sources not illustrated may be included or considered.

As illustrated, the machine learning system can use data such as forecasted flight demographics 460 and aircraft configurations 470 to generate the forecasted parts demographics 475. As discussed above, these forecasted parts demographics 475 may be used to predict future part consumption (e.g., using the workflow 300 of FIG. 3).

The forecasted flight demographics 460 generally include information relating to future or expected flights for one or more future windows of time. For example, as discussed above, the forecasted flight demographics 460 may include data such as the total number of flights expected for each aircraft (or type of aircraft), the expected flight times or durations, and the like. By correlating this flight information with the specific parts active on each aircraft (or type of aircraft), the machine learning system can determine the demographics of each part (or type of part).

As illustrated, the aircraft configurations 470 generally include information relating to which part types are used by each aircraft (or aircraft type). For example, for each alternative type of aircraft (e.g., each model of airplane), the aircraft configurations 470 may indicate the specific types of part that are used and/or the number of each type of part that is used by each such aircraft. In embodiments, this may include generic information (e.g., indicating that aircraft of the given type use N parts of a given type) and/or specific information (e.g., indicating that a specific aircraft (designated by a specific tail number or other identifier) had M parts of the specific type during the window).

In some embodiments, the machine learning system may determine and/or evaluate planned maintenance events 465 in order to determine aircraft configurations 470 during a future window of time. That is, the machine learning system may identify evaluate future or scheduled maintenance events (e.g., indicating that a particular part or part type will be repaired and/or replaced on a given aircraft at a given time in the future) to determine or infer the overall aircraft configuration 470 for the specific aircraft (or for all aircraft of the given type) during the future window. In other embodiments, the aircraft configurations 470 may be determined via other means (such as predefined or fixed definitions provided by the aircraft manufacturer).

In the illustrated example, a variety of data may be used to determine the forecasted flight demographics 460 for the future window. For example, as illustrated, data relating to historical flight demographics 455 (which may correspond to or be determined similarly to historical flight demographics 210 of FIG. 2) and future flight schedules 450 may be used as a basis to extrapolate or predict the future forecasted flight demographics 460. For example, based on the historical flight demographics 455 and other data (such as future flight schedules 450), the machine learning system may infer or forecast the future flight demographics.

In the illustrated example, the machine learning system can also consider other data, including the current or expected aircraft numbers (indicated in box 405) and/or exogenous data 425 to determine the forecasted flight demographics 460. As depicted, the aircraft data 405 may include information relating to the numbers of each type of aircraft 410 that are currently in use, the expected deliveries 415 (e.g., the number and types of aircraft that will enter service during the window), and/or the expected retirements 420 (e.g., the number and types of aircraft that will exit service). Using such information, the machine learning system can determine the overall number and variety of aircraft in service, and use these values to refine the forecasted flight demographics.

Additionally, in the illustrated example, the exogenous data 425 can generally include information relating to external factors that affect future flight demographics, such as gross domestic product (GDP) growth 430, the price of crude oil 435, the value of airline stocks 440 (such as whether they are increasing, decreasing, or stagnant), as well as other various sources 445 (such as data relating to illnesses that may interfere with widespread travel). Such factors can have a predictive influence on the forecasted flight demographics 460 (e.g., because they generally affect how many flights will occur, where the flights will be, and the like).

As illustrated, the machine learning system can correlate the data (e.g., the forecasted flight demographics 460 and aircraft configurations 470) on a per-part type basis (e.g., correlating the data associated with each part number or other identifier) to create the forecasted parts demographics 225. As discussed above, the forecasted parts demographics generally include information relating to the expected numbers and demographics of each type of part for some future window. As discussed above, this data may be used as the input to the machine learning model in order to generate one or more predicted outputs (e.g., the expected part consumption in the future).

Figure 5:
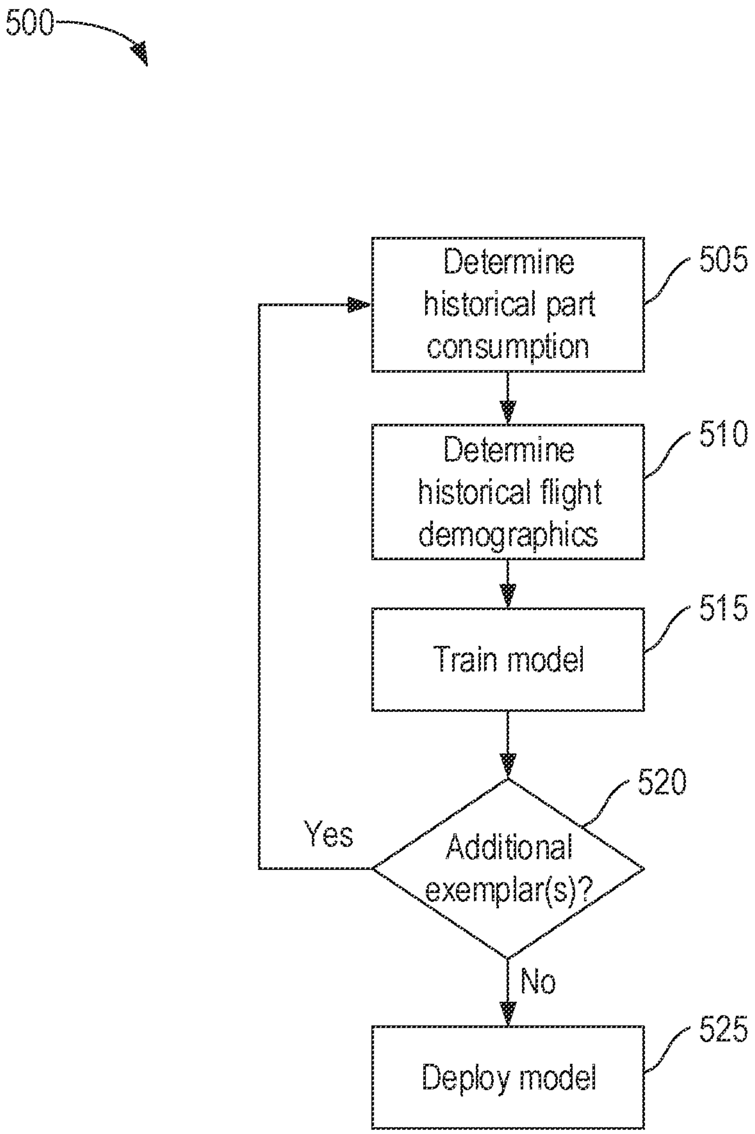
FIG. 5 is a flow diagram depicting an example method for training machine learning models to predict part consumption based on flight demographics.

FIG. 5 is a flow diagram depicting an example method 500 for training machine learning models to predict part consumption based on flight demographics. In some embodiments, the method 500 is performed by a machine learning system, such as the machine learning system 130 of FIG. 1 and/or the machine learning system 330 of FIG. 3. In other embodiments, the method 500 can be performed by one or more other systems, such as dedicated training system.

At block 505, the machine learning system determines historical part consumption. For example, the machine learning system may determine, access, or otherwise identify the historical part consumption 110 of FIG. 1. As discussed above, the historical part consumption generally indicates information about prior use or consumption of spare parts, such as the number of parts (of each type) that were consumed or used, the timing of the use or consumption, and the like. In at least one embodiment, the historical part consumption corresponds to prior spare part sales from a part manufacturer or distributor to one or more customers. In some embodiments, as discussed above, the historical consumption may be determined globally (e.g., all spare parts of all types in all locales). In some embodiments, the consumption may be determined on a per-part basis (enabling training of a separate model for each type of part), on a per-locale basis (enabling training of a separate model for each physical location or region), and the like.

At block 510, the machine learning system determines historical flight demographics associated with the historical part consumption. For example, the machine learning system may determine, generate, access, or otherwise identify the historical parts demographics 120 of FIG. 1, the historical flight demographics 210 of FIG. 2, and/or the historical parts demographics 225 of FIG. 2. As discussed above, the historical flight demographics generally indicate characteristics of prior flights, such as total or average flight durations, destination(s) flown to, total or average number of flight cycles (e.g., cycles of pressurization from ground level to cursing altitude), the total or average number of flights that used each part type, and the like.

In some embodiments, as discussed above, the historical flight demographics are used to determine specific demographics of each individual part or part type. As used herein, "flight demographics" may refer to the demographics of aircraft or flights themselves, and/or the specific demographics of individual parts thereon.

At block 515, the machine learning system trains one or more machine learning models based on the historical part consumption and historical flight demographics. For example, as discussed above, the machine learning system may correlate the historical consumption and demographics (e.g., based on time, part type, and the like) such that the part consumption information can be used as a target output for the demographics data. In one such embodiment, as discussed above, the machine learning system can train the model(s) by providing all or a subset of the historical flight demographics data as input to the model (e.g., processing the number of parts of a given type that were in use and the demographics of such parts using the model) to generate a predicted part consumption. This predicted consumption can be compared against the actual historical part consumption for the part in order to refine the model.

In some embodiments, the machine learning system can use each exemplar to individually refine the model (e.g., using stochastic gradient descent). In other embodiments, the machine learning system may use batches of exemplars to simultaneously refine the model (e.g., using batch gradient descent). As used herein, an exemplar refers to a set of historical flight demographics (e.g., for a given part type within a given window of time) and the associated historical part consumption of that part type (e.g., during the same window, or during an immediately subsequent window of time).

At block 520, the machine learning system determines whether there is at least one additional exemplar remaining that has not been used to refine the machine learning model(s). That is, the machine learning system can determine whether there is additional training data that has not yet been used to refine the model(s). If so, the method 500 returns to block 510 to determine historical part consumption (e.g., for a different part type and/or for a different window of time). If not, the method 500 continues to block 525. Although the illustrated example uses the availability of additional training data as a termination criteria, in some embodiments, the machine learning system may use a variety of termination criteria, such as a maximum number of training rounds or epochs, a maximum time or amount of computing resources spent training, a minimum desired model accuracy, and the like as termination criteria.

At block 525, the machine learning system deploys the trained machine learning model(s) for inferencing. As discussed above, this may include deploying the model locally (e.g., instantiating a local copy of the model based on the learned weights and/or biases), deploying it remotely on one or more other systems (e.g., transmitting the weights and/or biases to one or more other systems that use the model), and the like.

Figure 6:
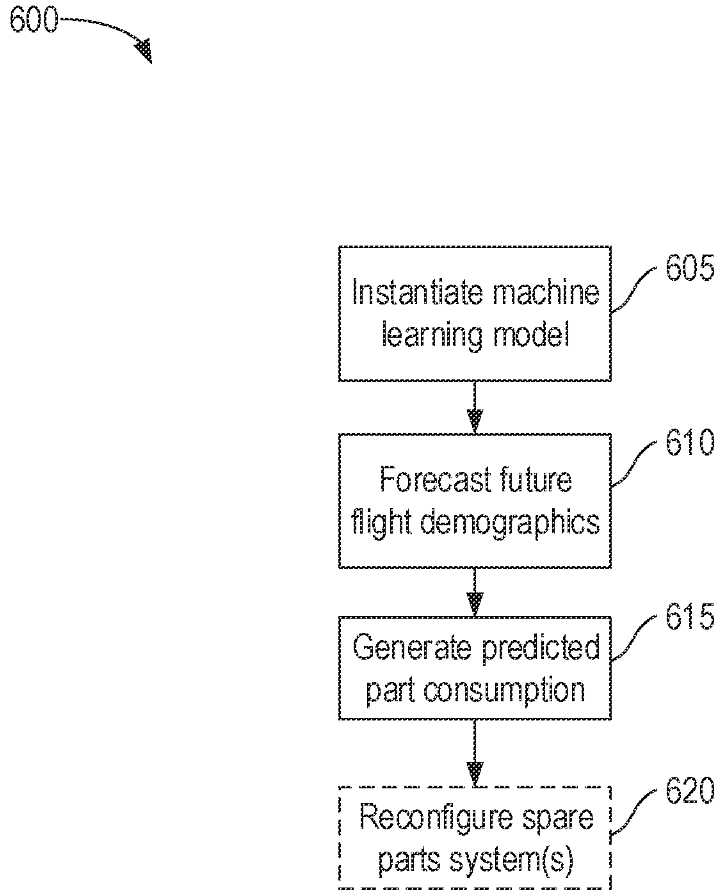
FIG. 6 is a flow diagram depicting an example method for using trained machine learning models to predict part consumption based on flight demographics.

FIG. 6 is a flow diagram depicting an example method 600 for using trained machine learning models to predict part consumption based on flight demographics. In some embodiments, the method 600 is performed by a machine learning system, such as the machine learning system 130 of FIG. 1 and/or the machine learning system 330 of FIG. 3. In other embodiments, the method 600 can be performed by one or more other systems, such as dedicated inferencing system.

At block 605, the machine learning system instantiates a machine learning model based on a set of learned parameters (e.g., weights and/or biases of a neural network). For example, the machine learning system may receive or determine the parameter information (as well as various hyperparameters or other model architecture information) from a training system (e.g., the machine learning system 130 of FIG. 1) and use this data to create a local copy of the machine learning model.

In some embodiments, as discussed above, the machine learning system may instantiate multiple models (e.g., a model for each specific part type, a model for each specific region, and the like), if multiple such models have been trained.

At block 610, the machine learning system forecasts future flight demographics for one or more future windows of time. For example, the machine learning system may determine, generate, access, or otherwise identify the forecasted parts demographics 320 of FIG. 3, the forecasted flight demographics 460 of FIG. 4, and/or the forecasted parts demographics 475 of FIG. 4. As discussed above, the forecasted future flight demographics generally indicate expected characteristics of future flights, such as total or average flight durations, destination(s) flown to, total or average number of flight cycles (e.g., cycles of pressurization from ground level to cursing altitude), the total or average number of flights that will use each part type, and the like.

In some embodiments, as discussed above, the future forecasted flight demographics are used to determine specific demographics of each individual part or part type. As used herein, "flight demographics" may refer to the demographics of aircraft or flights themselves, and/or the specific demographics of individual parts thereon.

In some embodiments, as discussed above, the machine learning system can forecast the parts and flight demographics on a per-part type basis and/or on a per-region basis. For example, the machine learning system may forecast the flight demographics of each specific part type based on underlying data such as aircraft configurations, expected flights of each configuration, historical demographics of each configuration and/or part, and the like. This can allow the machine learning system to generate part-specific predictions for each individual part type.

At block 615, the machine learning system generates predicted part consumption data by processing the forecasted future flight demographics using one or more machine learning models. For example, as discussed above, the machine learning system may process the forecasted flight demographics corresponding to a given part type using a model trained for the specific part type, thereby generating predicted consumption of that part type for one or more future windows or points in time. As discussed above, this may include predicting the number of parts (of the corresponding part type) that will be needed or consumed, the location(s) where the consumption will occur, and the like.

In some embodiments, as discussed above, the machine learning system may generate predicted part consumptions independently for each part type and/or for each locale or region. This can allow the machine learning system to generate specific and accurate consumption predictions that can be used to drive actionable and specific actions.

At block 620, the machine learning system can optionally take such actions, such as by reconfiguring the spare parts systems. For example, if the machine learning system is used by a parts manufacturer, the machine learning system can use the predicted consumption to reconfigure the manufacturing process (e.g., to control the number of each type of spare part that are constructed) to align with the predictions. As another example, if the machine learning system is used by a parts distributor, the machine learning system may reconfigure the spare parts system by ordering spare parts, storing spare parts, and/or distributing or shipping spare parts to specific locales based on the data. Similarly, if the machine learning system is used by a mechanic or other end user, the machine learning system may reconfigure the system by preemptively ordering the needed parts.

Although not included in the illustrated example, in some embodiments, the machine learning system may additionally collect feedback to refine or fine tune the model(s). For example, after predicting the part consumption, the machine learning system (or another system) may subsequently monitor actual part consumption. This actual consumption can be compared against the predicted consumption to refine the model (e.g., periodically, such as weekly or monthly). In some embodiments, the machine learning system can similarly refine the flight demographics forecasting based on subsequently collected data. For example, the machine learning system (or another system) may monitor actual flight demographics, and compare the actual demographics against the forecasted ones. This can allow the flight demographics forecasting models or techniques to be similarly refined or fine-tuned over time (e.g., weekly) to improve future predictions.

Figure 7:
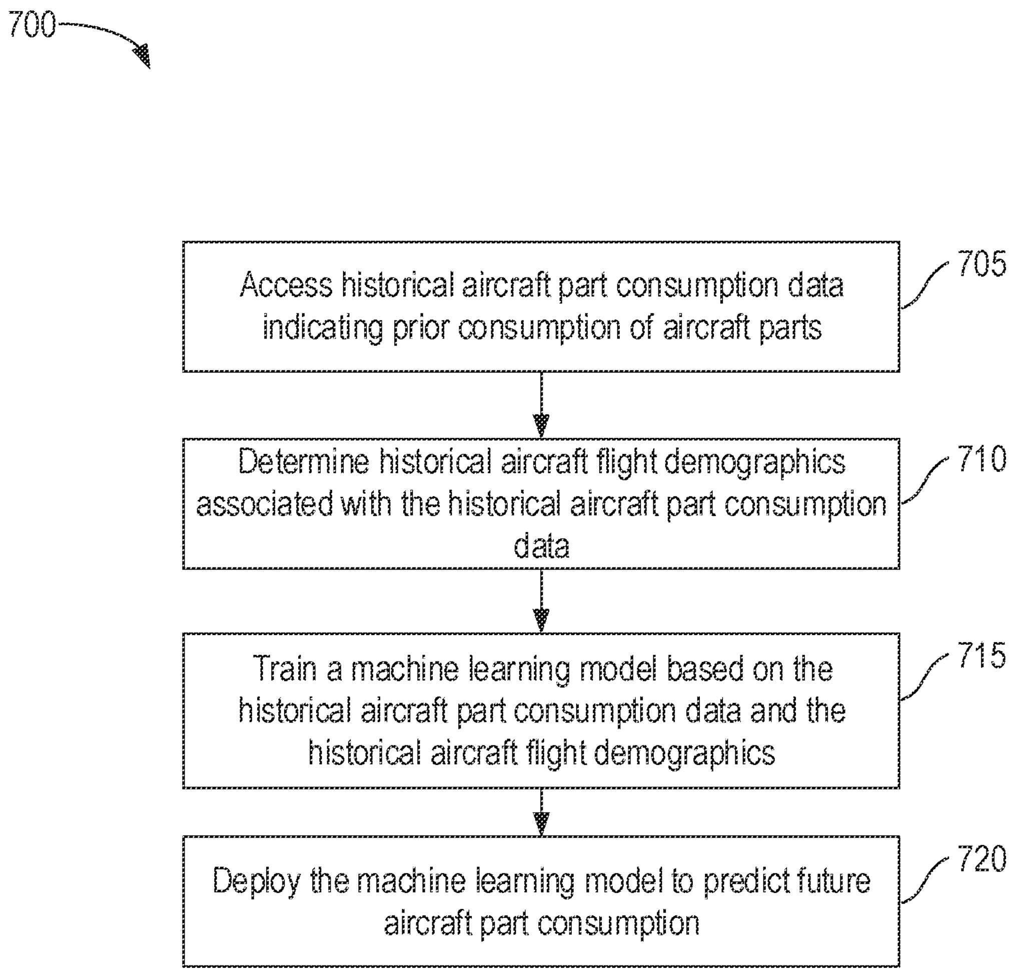
FIG. 7 is a flow diagram depicting an example method for training a machine learning model based on flight demographics.

FIG. 7 is a flow diagram depicting an example method for training a machine learning model based on flight demographics. In some embodiments, the method 700 is performed by a machine learning system, such as the machine learning system 130 of FIG. 1 and/or the machine learning system 330 of FIG. 3. In other embodiments, the method 700 can be performed by one or more other systems, such as dedicated training system.

At block 705, historical aircraft part consumption data indicating prior consumption of aircraft parts (e.g., historical part consumption 110 of FIG. 1) is accessed. In some embodiments, this operation may correspond to block 505 of FIG. 5.

At block 710, historical aircraft flight demographics associated with the historical aircraft part consumption data (e.g., historical parts demographics 120 of FIG. 1) are determined. In some embodiments, this operation may correspond to block 510 of FIG. 5.

At block 715, a machine learning model (e.g., machine learning mode 140 of FIG. 1) is trained based on the historical aircraft part consumption data and the historical aircraft flight demographics. In some embodiments, this operation may correspond to block 515 of FIG. 5.

At block 720, the machine learning model is deployed to predict future aircraft part consumption. In some embodiments, this operation may correspond to block 525 of FIG. 5.

In some embodiments, the historical aircraft part consumption data comprises, for each respective part type of a plurality of part types, a respective amount of the respective part type that was consumed for aircraft maintenance during a window of time.

In some embodiments, the historical aircraft flight demographics comprises amounts of each respective part type, of the plurality of part types, that were in aircraft service during the window of time, flight times associated with each respective part type, of the plurality of part types, during the window of time, numbers of flights associated with each respective part type, of the plurality of part types, during the window of time, and destination locales of flights associated with each respective part type, of the plurality of part types, during the window of time.

In some embodiments, training the machine learning model comprises generating predicted aircraft part consumption by processing the historical aircraft flight demographics using the machine learning model, determining a difference between the historical aircraft part consumption data and the predicted aircraft part consumption, and refining the machine learning model based on the difference.

In some embodiments, the method 700 further includes forecasting future aircraft flight demographics, and generating predicted future aircraft part consumption by processing the future aircraft flight demographics using the machine learning model.

In some embodiments, forecasting the future aircraft flight demographics includes forecasting, for each respective aircraft type of a plurality of aircraft types, a respective number of aircraft of the respective type that will be used, and forecasting one or more exogenous indicators.

In some embodiments, forecasting, for each respective aircraft type of a plurality of aircraft types, the respective number of aircraft of the respective type that will be used comprises, for each respective aircraft type of the plurality of aircraft types: determining a respective current number of active aircraft associated with the respective aircraft type, determining a respective number of expected deliveries of aircraft associated with the respective aircraft type, and determining a respective number of retirements of aircraft associated with the respective aircraft type.

In some embodiments, the one or more exogenous indicators comprise gross domestic product (GDP) growth, crude oil price, and stock price of one or more airlines.

Figure 8:
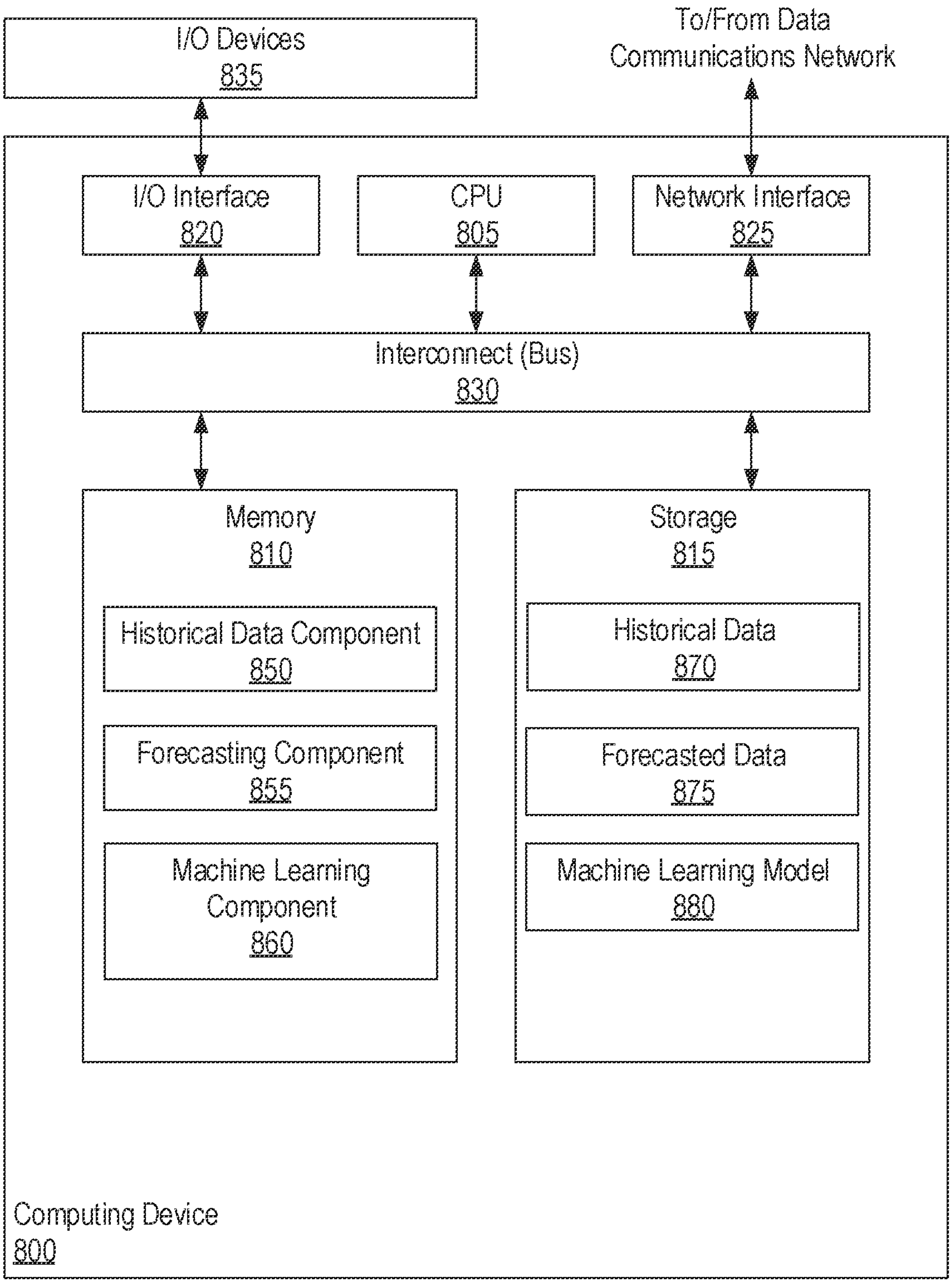
FIG. 8 illustrates a computing device, according to aspects of the present disclosure.

FIG. 8 illustrates a computing device 800, according to aspects of the present disclosure. Although depicted as a physical device, in embodiments, the computing device 800 may be implemented using virtual device(s), and/or across a number of devices (e.g., in a cloud environment). In one embodiment, the computing device 800 corresponds to the machine learning system 130 of FIG. 1 and/or the machine learning system 330 of FIG. 3.

As illustrated, the computing device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a historical data component 850, a forecasting component 855, and a machine learning component 860, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In one embodiment, the historical data component 850 is used to generate, determine, evaluate, or otherwise identify historical data, such as historical parts demographics 120 of FIG. 1, as discussed above. These historical data can be used to train machine learning models, as discussed above. The forecasting component 855 may generally be used to estimate, forecast, or otherwise determine future demographics, such as forecasted parts demographics 320 of FIG. 3, as discussed above. These forecasted data may be used to predict future consumption, as discussed above. The machine learning component 860 may be used to train machine learning models based on historical data, and/or to use trained machine learning models to predict future part consumption, as discussed above.

In the illustrated example, the storage 815 includes historical data 870 (which may correspond to historical data 105 of FIG. 1). The storage 815 also includes forecasted data 875 (which may correspond to the input data 305 of FIG. 3). As illustrated, the storage 815 also includes one or more machine learning models 880 (which may correspond to the machine learning model 140 of FIG. 1). Although depicted as residing in storage 815, the historical data 870, forecasted data 875, and machine learning model(s) 880 may be stored in any suitable location, including memory 810.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer program product, the computer program product comprising a non-transitory computer-readable storage medium having computer-readable program code embodied therewith, the computer-readable program code executable by one or more computer processors to perform an operation, the operation comprising:

forecasting, for at least a first aircraft type of a plurality of aircraft types, a number of aircraft of the first aircraft type that will be in service during a future window of time;

forecasting future flight demographics during the future window of time based at least in part on the forecasted number of aircraft;

determining an aircraft configuration for the first aircraft type, the aircraft configuration indicating a number of parts of a first part type on each aircraft of the first aircraft type;

generating predicted part consumption of the first part type during the future window of time by processing the future flight demographics and the aircraft configuration using a machine learning model, wherein the machine learning model is a neural network, and refining the machine learning model comprises using back-propagation to iteratively refine at least one of weights or biases of the neural network;

wherein the predicted part consumption represents a predicted number of parts of the first part type that will be consumed during the future window of time by the aircraft of the first aircraft type;

facilitating reconfiguration of a spare part system based on the predicted part consumption, wherein the one or more computer processors are configured to facilitate the reconfiguration of the spare part system by controlling a number of the first part type that is at least one of constructed, ordered, stored, or shipped based on the predicted number of parts of the first part type that will be consumed during the future window of time;

monitoring actual part consumption of the first part type during the future window of time;

and refining the machine learning model based on a comparison of the actual part consumption to the predicted part consumption.

2. The computer program product of claim 1, wherein the future flight demographics comprise predicted time in flight of the aircraft of the first aircraft type during the future window of time.

3. The computer program product of claim 1, wherein forecasting the future flight demographics comprises forecasting one or more exogenous indicators.

4. The computer program product of claim 3, wherein the one or more exogenous indicators comprise one or more of:

gross domestic product (GDP) growth;

crude oil price; or stock price of one or more airlines.

5. The computer program product of claim 1, wherein forecasting the number of aircraft of the first aircraft type that will be in service during the future window of time comprises:

determining a current number of active aircraft of the first aircraft type currently in service;

determining a number of expected deliveries of new aircraft of the first aircraft type during the future window of time; and determining a number of retirements of existing aircraft of the first aircraft type during the future window of time.

6. A method, comprising:

forecasting, for at least a first aircraft type of a plurality of aircraft types and via one or more processors, a number of aircraft of the first aircraft type that will be in service during a future window of time;

forecasting, via the one or more processors, future flight demographics during the future window of time based at least in part on the forecasted number of aircraft;

determining, via the one or more processors, an aircraft configuration for the first aircraft type, the aircraft configuration indicating a number of parts of a first part type on each aircraft of the first aircraft type;

generating predicted part consumption of the first part type during the future window of time by processing the future flight demographics and the aircraft configuration using a machine learning model, wherein the machine learning model is a neural network, and refining the machine learning model comprises using back-propagation to iteratively refine at least one of weights or biases of the neural network;

wherein the predicted part consumption represents a predicted number of parts of the first part type that will be consumed during the future window of time by the aircraft of the first aircraft type;

facilitating reconfiguration of a spare part system, via the one or more processors, based on the predicted part consumption, wherein facilitating the reconfiguration of the spare part system comprises controlling a number of the first part type that is at least one of constructed, ordered, stored, or shipped based on the predicted number of parts of the first part type that will be consumed during the future window of time;

monitoring actual part consumption of the first part type during the future window of time;

refining the machine learning model based on a comparison of the actual part consumption to the predicted part consumption.

7. The method of claim 6, wherein forecasting the future flight demographics comprises predicted time in flight of the aircraft of the first aircraft type during the future window of time.

8. The method of claim 6, wherein forecasting the future flight demographics comprises forecasting one or more exogenous indicators.

9. The method of claim 8, wherein the one or more exogenous indicators comprise one or more of:

gross domestic product (GDP) growth;

crude oil price; or stock price of one or more airlines.

10. The method of claim 6, wherein forecasting the number of aircraft of the first aircraft type that will be in service during the future window of time comprises:

determining a current number of active aircraft of the first aircraft type currently in service;

determining a number of expected deliveries of new aircraft of the first aircraft type during the future window of time; and determining a number of retirements of existing aircraft of the first aircraft type during the future window of time.

11. The method of claim 6, further comprising:

determining, via the one or more processors and based on the future flight demographics and the aircraft configuration, forecasted part demographics of the first part type associated with the first aircraft type, the forecasted part demographics including (i) a total number of the parts of the first part type that are predicted to be installed on the aircraft of the first aircraft type during the future window of time and (ii) at least one of a total or average flight hours for the parts of the first part type predicted to be installed on the aircraft of the first aircraft type during the future window of time, wherein generating the predicted part consumption of the first part type comprises inputting the forecasted part demographics into the machine learning model for the machine learning model to output the predicted part consumption.

12. A system, comprising:

one or more processors; and a memory storage device communicatively connected to the one or more processors and including program instructions, the one or more processors configured to execute the program instructions to:

forecast a number of aircraft of a first aircraft type that will be in service during a future window of time;

forecast future flight demographics during the future window of time based at least in part on the forecasted number of aircraft and future flight schedules for flights scheduled to occur within the future window of time;

determine an aircraft configuration for the first aircraft type, the aircraft configuration indicating a number of parts of a first part type on each aircraft of the first aircraft type;

generate predicted part consumption of the first part type during the future window of time by processing the future flight demographics and the aircraft configuration using a machine learning model, wherein the machine learning model is a neural network, and refining the machine learning model comprises using back-propagation to iteratively refine at least one of weights or biases of the neural network;

wherein the predicted part consumption represents a predicted number of parts of the first part type that will be consumed during the future window of time by the aircraft of the first aircraft type;

facilitate reconfiguration of a spare part system based on the predicted part consumption, wherein the one or more computer processors are configured to facilitate the reconfiguration of the spare part system by controlling a number of the first part type that is at least one of constructed, ordered, stored, or shipped based on the predicted number of parts of the first part type that will be consumed during the future window of time;

monitor actual part consumption of the first part type during the future window of time;

and refine the machine learning model based on a comparison of the actual part consumption to the predicted part consumption.

13. The system of claim 12, wherein the future flight demographics comprise predicted time in flight of the aircraft of the first aircraft type during the future window of time.

14. The system of claim 12, wherein the one or more processors are configured to forecast the future flight demographics based in part on forecasting one or more exogenous indicators.

15. The system of claim 14, wherein the one or more exogenous indicators comprise one or more of:

gross domestic product (GDP) growth;

crude oil price; or stock price of one or more airlines.

16. The system of claim 12, wherein the one or more processors are configured to forecast the number of aircraft of the first aircraft type that will be in service during the future window of time by:

determining a current number of active aircraft of the first aircraft type currently in service;

determining a number of expected deliveries of new aircraft of the first aircraft type during the future window of time; and determining a number of retirements of existing aircraft of the first aircraft type during the future window of time.

17. The system of claim 12, wherein the one or more processors are configured to determine, based on the future flight demographics and the aircraft configuration, forecasted part demographics of the first part type associated with the first aircraft type, wherein the forecasted part demographics include (i) a total number of the parts of the first part type that are predicted to be installed on the aircraft of the first aircraft type during the future window of time and (ii) at least one of a total or average flight hours for the parts of the first part type that are predicted to be installed on the aircraft of the first aircraft type during the future window of time.

18. The system of claim 17, wherein the one or more processors are configured to input the forecasted part demographics into the machine learning model for the machine learning model to output the predicted part consumption.

* * * * *